United States Patent
Turner

(10) Patent No.: US 10,530,420 B2
(45) Date of Patent: Jan. 7, 2020

(54) SCHEDULED COMMUNICATION WITH RESOURCE PROVIDERS AND A HOME AREA NETWORK

(71) Applicant: LANDIS+GYR INNOVATIONS, INC., Alpharetta, GA (US)

(72) Inventor: James Randall Turner, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 78 days.

(21) Appl. No.: 15/585,819

(22) Filed: May 3, 2017

(65) Prior Publication Data

US 2017/0324443 A1 Nov. 9, 2017

Related U.S. Application Data

(60) Provisional application No. 62/330,953, filed on May 3, 2016.

(51) Int. Cl.
*H04W 4/00* (2018.01)
*H04B 1/7156* (2011.01)
(Continued)

(52) U.S. Cl.
CPC ............ *H04B 1/7156* (2013.01); *H04W 4/80* (2018.02); *H04W 72/1215* (2013.01);
(Continued)

(58) Field of Classification Search
USPC ....... 370/229, 230, 235, 236, 252, 311, 328, 370/329, 330, 336, 337, 345, 347, 466
See application file for complete search history.

(56) References Cited

U.S. PATENT DOCUMENTS

2007/0019604 A1* 1/2007 Hur ................. H04W 74/02 370/347
2008/0316966 A1* 12/2008 Joshi ................ H04W 74/02 370/330

(Continued)

FOREIGN PATENT DOCUMENTS

WO 2017192720 11/2017

OTHER PUBLICATIONS

Shrestha , "Analysis of Hybrid CSMA/CA-TDMA Channel Access Schemes with Application to Wireless Sensor Networks", Thesis submitted to the faculty of Graduate Studies of The University of Manitoba, Nov. 27, 2013, pp. 1-158.

(Continued)

*Primary Examiner* — Kwang B Yao
*Assistant Examiner* — Nguyen H Ngo
(74) *Attorney, Agent, or Firm* — Kilpatrick Townsend & Stockton LLP

(57) ABSTRACT

Systems and methods are disclosed for providing scheduled communication between a primary network, such as a time synchronized channel hopping ("TSCH") network, and a secondary network, such as a carrier sense multiple access ("CSMA") network. During a first selected slot-offset in a TSCH hopping pattern, a gateway node communicates with a primary network node. During a second selected slot-offset in the TSCH hopping pattern, the gateway node communicates with a secondary network node. A communication schedule identifies the source and destination nodes and channel frequency for each slot-offset. The communication schedule is set such that the CSMA wake-up period for the secondary network is synchronized with the second slot-offset in the TSCH hopping pattern.

18 Claims, 8 Drawing Sheets

(51) Int. Cl.
*H04W 72/12* (2009.01)
*H04W 74/08* (2009.01)
*H04W 84/18* (2009.01)
*H04W 4/80* (2018.01)
*H04W 88/16* (2009.01)

(52) U.S. Cl.
CPC ... *H04W 72/1263* (2013.01); *H04W 74/0816* (2013.01); *H04W 84/18* (2013.01); *H04B 2001/71563* (2013.01); *H04W 88/16* (2013.01)

(56) References Cited

U.S. PATENT DOCUMENTS

| | | | | |
|---|---|---|---|---|
| 2010/0329221 A1* | 12/2010 | Nakano | ............... | H04L 12/4035 370/336 |
| 2012/0182867 A1* | 7/2012 | Farrag | ............... | H04W 28/0236 370/230 |
| 2013/0022053 A1* | 1/2013 | Vasseur | ................. | H04L 47/10 370/428 |
| 2013/0250787 A1* | 9/2013 | Zhang | ................. | H04J 3/1694 370/252 |
| 2013/0259016 A1 | 10/2013 | Xhafa et al. | | |
| 2013/0279491 A1* | 10/2013 | Rubin | ................... | G08G 1/166 370/347 |
| 2014/0105063 A1* | 4/2014 | Jeong | ................... | H04W 24/02 370/254 |
| 2015/0036570 A1* | 2/2015 | Jeong | ............... | H04W 52/0216 370/311 |
| 2015/0382274 A1* | 12/2015 | Logvinov | ........... | H04L 41/0833 370/311 |
| 2016/0021596 A1* | 1/2016 | Hui | ....................... | H04W 40/04 370/329 |
| 2017/0251467 A1* | 8/2017 | Dame | .................... | H04W 4/38 |
| 2018/0035442 A1* | 2/2018 | Jin | ....................... | H04L 1/1887 |

OTHER PUBLICATIONS

PCT/US2017/030837, "International Search Report and Written Opinion", dated Jul. 28, 2017, 11 pages.

Rhee et al., "OSIA Standards & Technology Review Journal", OSIA Standards & Technology Review Journal vol. 23, No. 3 Available Online at:—http://www.osia.or.kr/board/include/download.php?no=76&db=Sntr&fileno=1, Sep. 2010, 58 pages.

* cited by examiner

SCHEDULED COMMUNICATION WITH RESOURCE PROVIDERS AND A HOME AREA NETWORK

CROSS REFERENCE TO RELATED APPLICATIONS

This disclosure is related to and claims the benefit of priority of U.S. Provisional Application No. 62/330,953, titled "Scheduled Communication with Resource Providers and a Home Area Network" and filed on May 3, 2016, which is hereby incorporated in its entirety by this reference.

TECHNICAL FIELD

The present disclosure relates generally to computer network and multiplex communication and more specifically, but not by way of limitation, this disclosure relates to communications between resource providers and home area networks.

BACKGROUND

A time-slotted channel hopping ("TSCH") network can be defined by IEEE 802.15.4 and provide a communications network for resource providers (e.g., utility companies, home automation providers, industrial automation providers, or scientific and environmental application providers). A home area network may be used to communicate information between devices that consume resources (e.g., electricity) in a home or other premises and devices that monitor and/or manage the consumption of resources. Utility companies and other resource providers may use home area networks to monitor consumption of the resources by consumers.

Utility companies and resource providers may operate on a time synchronized network, while a home area network may operate on a separate network that is not synchronized to the time synchronized network. Devices on the home area network may be idle for periods of time and communicate with the utility companies and resource providers intermittently.

SUMMARY

The present disclosure describes systems and methods for scheduled communication with a home area network ("HAN") communicating using a non-time synchronized protocol, such as carrier sense multiple access ("CSMA") protocol, and a data network communicating using a time synchronized channel hopping ("TSCH") protocol. The data network connects the HAN with resource providers that manage the consumption of the HAN resources. In an example system, a gateway node is a node in the data network that communicates with a HAN controller or HAN client devices. The HAN controller may be configured for communicating information regarding a resource consumed at a geographical area serviced by the HAN. The gateway node communicates between adjacent nodes in the primary network and with the HAN according to a communication schedule that identifies the recipient node or source node for communication for each slot-offset in the TSCH hopping pattern. The communication schedule also identifies the type of communication (whether it is for receiving RF signals, transmitting RF signals, or communication with the HAN via the CSMA protocol) and identifies a channel for communication. The channel indicates a specific frequency or frequency range for RF communication.

By communicating using a CSMA protocol, devices in the HAN communicate during certain wake-up intervals that may be periodic or pre-determined. Devices in the HAN remain in a low-powered sleep state when the devices are not in a wake-up interval. To allow the gateway node to communicate with both the TSCH-based data network and the CSMA-based HAN, the communication schedule is set such that the wake-up intervals of the HAN are synchronized with a particular TSCH slot-offset. Based on the communication schedule, during a first slot-offset in the TSCH hopping pattern, the gateway node communicates with an adjacent node in the data network on a channel used by the data network. During a second slot-offset in the TSCH hopping pattern, the gateway node listens for communication or communicates with the HAN controller or HAN client device on the channel used by the HAN. The communication scheduling for the slot-offsets repeats for the repeating TSCH hopping pattern.

The communication schedule may be received by the gateway node via a common communication from a head-end unit managing operations of the data network or via distributed communication from an adjacent node on the data network. For example, the HAN controller or HAN client device may communicate scheduling requirements to adjacent nodes or to a parent node via a beacon message. The beacon message transmitted by a HAN device may indicate the wake-up pattern for the device. Based on the wake-up pattern in the received beacon message, the head-end unit determines a communication schedule that schedules the wake-up periods to correspond to a specific TSCH hopping pattern slot-offset. The head-end unit distributes the communication schedule to multiple nodes, including the gateway node, in the data network. In an alternative aspect, the communication schedule is determined by a node in the data network (e.g., the gateway node) and distributed to adjacent nodes in the data network.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
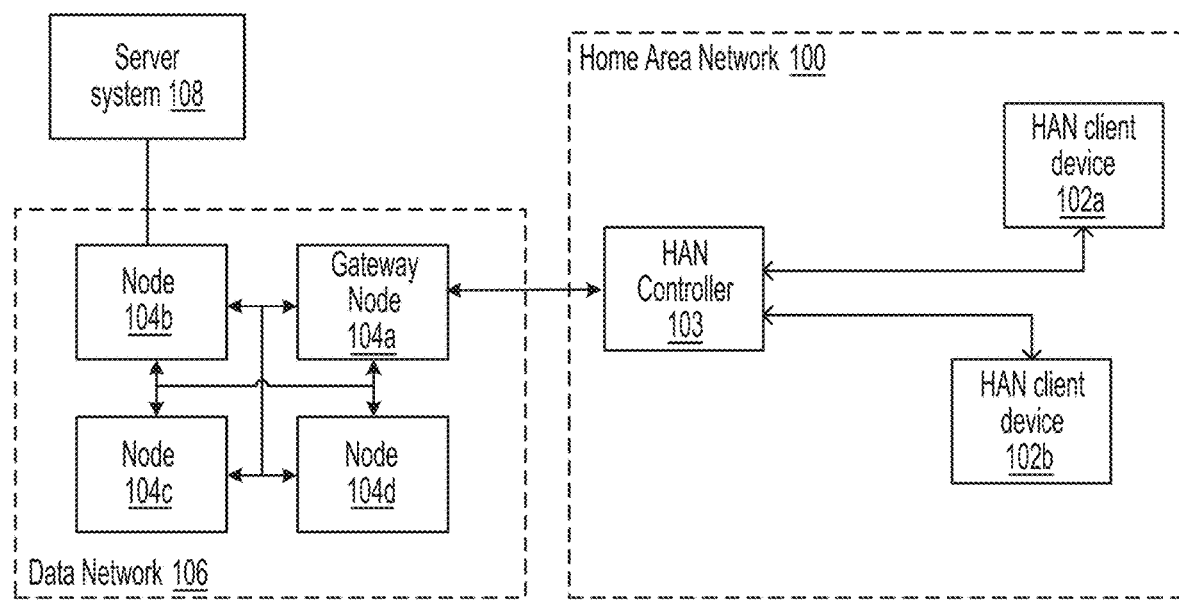
FIG. 1 is a block diagram of an example of a network for implementing scheduled communication between a primary network using a time synchronized channel hopping ("TSCH") protocol and a secondary network using a carrier sense multiple access ("CSMA") protocol according to one aspect of the present disclosure.

Systems and methods are provided for providing scheduled communication between a primary network operating using a time synchronized communication protocol with a secondary network using a non-time synchronized communication protocol. The primary network can be used to couple the secondary network with a resource provider system. A primary network includes, for example, an advanced metering infrastructure ("AMI") mesh network comprising one or more nodes for a resource provider system that communicate using a time synchronized channel hopping ("TSCH") communication protocol, defined by IEEE 802.15.4(e). By communicating using a TSCH protocol, nodes within the primary network transmit and receive signals using a series of time slots according to a scheduled frequency hopping pattern. The secondary network includes, for example, a home area network ("HAN") with nodes that communicate using a carrier sense multiple access ("CSMA") protocol. By communicating using a CSMA protocol, nodes in the secondary network transmit and receive signals at a set frequency during wake-up intervals. Some aspects described herein provide features for scheduled communication between the primary network operating under the TSCH protocol and the secondary network operating under the CSMA protocol, allowing the two different types of mesh networks to co-exist.

For example, a gateway node can determine a communication schedule that accommodates the secondary network node wake-up cycle. The communication schedule for the gateway node may instruct the gateway node to transmit communication to a destination node in the primary network at a first selected time slot and at a first frequency channel, receive communication from a source node in the primary network at a second selected time slot and at a second frequency channel, and communicate with a neighboring secondary network node during a third selected time slot and at a third frequency channel. The third selected time slot corresponds to the periodic wake-up period of the CSMA network and the third frequency channel corresponds to the specific frequency channel used within the secondary network. Deterministic scheduling of secondary network communication into specific time slots of a primary network using the TSCH protocol guarantees that a portion of overall bandwidth in the primary/TSCH network will be allocated to connectivity with the secondary/CSMA network.

These illustrative examples are given to introduce the reader to the general subject matter discussed here and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is an example of a network environment including a HAN 100 that is communicatively coupled to a gateway node 104a. The HAN 100 operates using any suitable non-time synchronized protocol, such as a CSMA networking protocol. The HAN 100 can include HAN client devices 102a, 102b and a HAN controller 103. Along with gateway node 104a, the data network 106 can include multiple nodes in a mesh network, shown as nodes 104b-d. Each of the nodes 104b-d may operate as a gateway node and be coupled to respective HANs (not shown).

The HAN client devices 102a-b include devices used to perform one or more applications related to managing, monitoring, or performing functions that consume power from a power distribution system (e.g., a gas power network or other power distribution system) associated with the HAN 100. Non-limiting examples of such client devices 102a-b include a programmable thermostat for managing power consumption, an in-home display device for displaying information related to power consumption and associated billing information for the power consumption, and the like. In some aspects, one or more of the HAN client devices 102a-b may be a device that consumes power to perform one or more mechanical functions or other functions in addition to analyzing, monitoring, displaying, or otherwise using data communicated via the HAN 100. Non-liming examples of such devices include devices that consume power to perform one or more mechanical functions in a dwelling or other structure serviced by the HAN 100, such as (but not limited to) a water heater, a pool pump, an air conditioner, etc. HAN client devices 102a-b and HAN controller 103 can wirelessly communicate with each other and with the gateway node 104a. As mentioned above, communication within the HAN 100 and with the gateway node 104a may occur via any suitable CSMA networking protocol. As described above, by communicating under a CSMA networking protocol, the HAN controller 103 periodically exits a sleep state and powers on an RF transceiver to communicate with gateway node 104. The wake-up intervals of the HAN controller 103 are configured into the channel hopping communication schedule of the gateway node 104a. Further details of scheduling CSMA wake-up intervals into a TSCH channel hopping pattern in aspects herein are described below in FIGS. 3-5.

The HAN controller 103 includes any suitable computing device configured to communicate data between the HAN 100 and the gateway node 104a separate from the HAN 100. The HAN controller 103 includes an application processor that can access or include a memory device that stores program code executable by the application processor. The application processor of the HAN controller 103 communicates power consumption information between HAN client devices 102a-b and the gateway node 104a. Multiple HAN controllers 103 may monitor respective structures that are units of a multi-dwelling unit and that include respective HANs 100. While HAN 100 with HAN controller 103 communicatively coupled to HAN client devices 102a-b is shown for illustrative purposes, other aspects are also possible. For example, the HAN controller 103 can also be separate from the HAN 100 or a HAN 100 may not include a HAN controller 103. If a HAN controller 103 is not used, then HAN client devices 102a-b communicate directly with the gateway node 104a via the deterministic scheduling of CSMA wake-up intervals into the TSCH hopping pattern of gateway node 104a. References to communication between the gateway node 104a and the HAN 100 include communication between the gateway node 104a and the HAN controller 103 or communication between the gateway node 104a and a HAN client device 102a-b. HAN client devices 102a-b include metering devices for monitoring power consumption information and communicate the respective power consumption information directly to the gateway node 104a. In some aspects, gateway nodes 104a-d include metering information that monitor, collect, or otherwise manage power consumption information of HAN 100 and HAN client devices 102a-b.

The gateway node 104a communicates the information from the HAN controller 103 to a server system 108 via a data network 106, which may be implemented as an AMI mesh network using a TSCH protocol. A non-limiting example of a server system 108 is a head-end system for a power distribution network that provides power to a dwelling, structure, or other geographical area serviced by the HAN 100. The gateway node 104a provides communication between the rest of the data network 106 and the HAN 100. The data network 106 can provide a communication channel between the gateway node 104 and the server system 108. A communication channel can include any suitable means capable of communicating signals between the HAN gateway node 104a and the server system 108. Examples of suitable communication media include (but are not limited to) Ethernet cable, wireless data communication, power cables for use in power line communication ("PLC"), etc. Power line communication can include communicating signals via cables used for providing electric power from a utility company to buildings in a geographic area. The data network 106 can be configured using any suitable network topology, such as (but not limited to) a mesh network (as mentioned above), a ring network, a star network, a bus network, etc. The data network 106 can include other nodes, shown as gateway nodes 104b-d.

In some examples, the gateway node 104a is used to provide connectivity between the HAN 100 and a resource provider system. For example, the HAN 100 can communicatively link multiple devices associated with a power distribution system in a dwelling, a structure, or other suitable geographical area. As used herein, the term "power distribution system" is used to refer to a group of devices, systems, and/or other suitable infrastructure for transferring power from a power source, such as a power plant, to one or more end users or geographical locations, such as a dwelling, structure, or other geographical area. The HAN 100 can include a smaller number of network devices (e.g., personal computers, mobile computing devices, etc.) than larger data networks such as a local area network or a wide area network. The HAN 100 can include low-power network devices that can wirelessly communicate with other devices in the HAN 100.

In some aspects, the nodes 102a-b within the HAN 100 communicate using a non-time synchronized communication protocol, such as a CSMA communication protocol. Non-limiting examples of the HAN 100 include a HomePlug network implemented via power line communications, a Multimedia over Coax Alliance ("MoCA") network providing network connectivity between appliances and networking devices implemented via coaxial cable, a HomePNA Alliance network, etc. The HAN controller 103 can receive and/or collect information regarding electricity or another resource consumed in the dwelling or structure serviced by the HAN 100. The HAN controller 103 utilizes the same networking protocol as the rest of the nodes 102a-b in the HAN 100. As described above, as low-powered CSMA devices, devices within the HAN 100 communicate at specific time intervals that correspond to predefined wake-up patterns. During a sleep state, the CSMA devices power down the RF transceivers.

Figure 2:
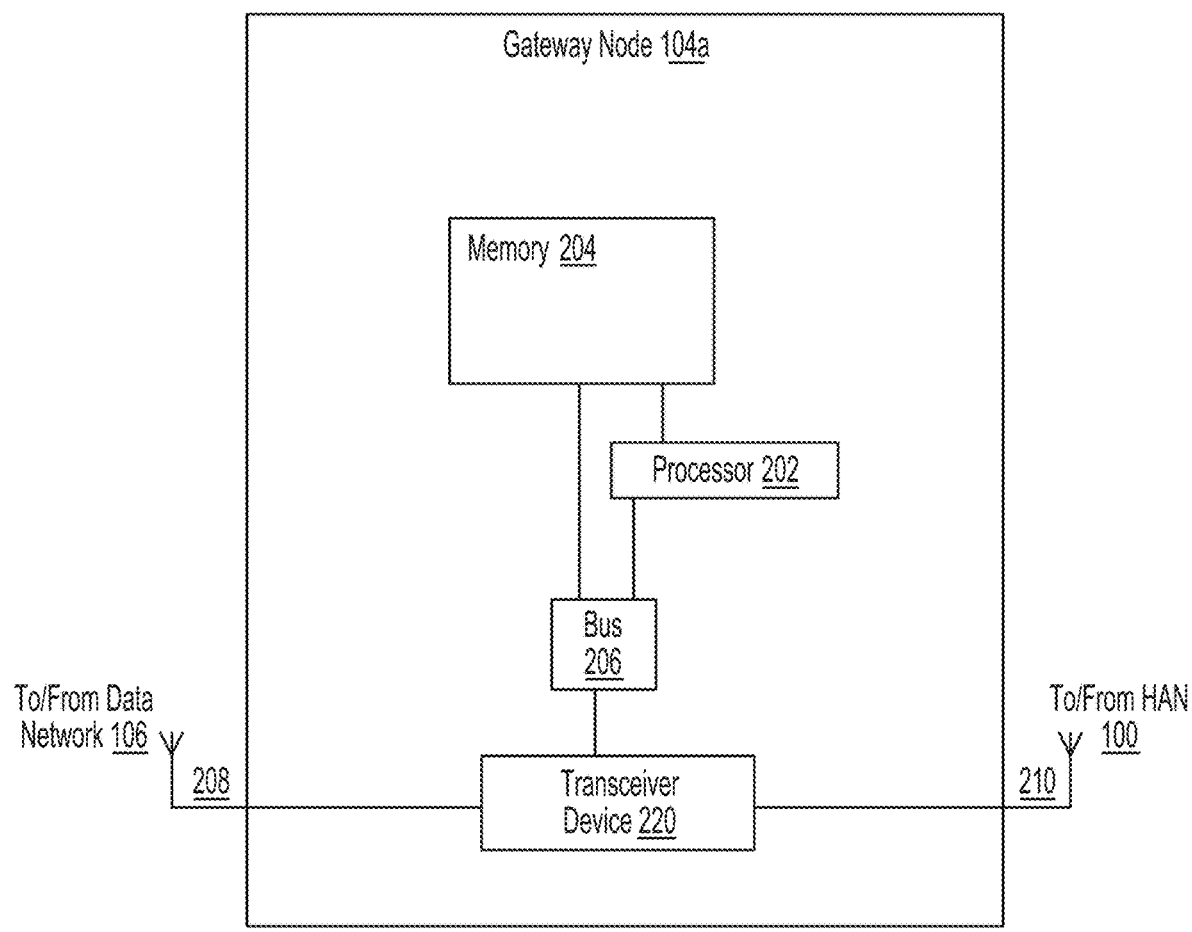
FIG. 2 is a block diagram of an example of a gateway node configured to communicate with both a TSCH-based data network and a CSMA-based home area network according to one aspect of the present disclosure.

The gateway node 104a can be installed in or near the dwellings or structures serviced by the HAN 100 and can communicate with the HAN controller 103 using the secondary network. The gateway node 104a can also communicate with a head-end system or other controller for a resource provider server system via the primary data network operating the TSCH networking protocol. Although the gateway node 104a is shown in FIG. 2 as part of the data network 106, the gateway node 104a is also joined to the HAN 100. As used herein, the term "head-end system" is used to refer to a device or group of devices used to provide one or more management functions for a data network or other system including multiple interconnected devices. For example, a head-end system for a power distribution system using intelligent metering may provide communication and/or data collection layers between the smart meter infrastructure of the power distribution system and one or more higher-level data processing systems of the power distribution system. The gateway node 104a is configured with a schedule for communicating with the HAN controller 103 (or other node 102a-b in the HAN 100) during the wake-up intervals of the HAN controller 103.

FIG. 2 depicts a block diagram depicting an example hardware configuration of a gateway node 104a configured to communicate with both the HAN 100 and the rest of the data network 106. The gateway node 104a can include a processor 202. Non-limiting examples of the processor 202 includes a microprocessor, an application-specific integrated circuit (ASIC), a state machine, a field programmable gate array (FPGA) or other suitable processing device. The processor 202 can include any number of processing devices, including one. The processor 202 can be communicatively coupled to non-transitory computer-readable media, such as memory device 204. The processor 202 can execute computer-executable program instructions and/or access information stored in the memory device 204.

The memory device 204 can store instructions that, when executed by the processor 202, cause the processor 202 to perform operations described herein. The memory device 204 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The gateway node 104a can also include a bus 206. The bus 206 can communicatively couple one or more components of the gateway node 104a. Although the processor 202, the memory device 204, and the bus 206 are respectively depicted in FIG. 2 as separate components in communication with one another, other implementations are possible. For example, the processor 202, the memory device 204, and the bus 206 can be respective components of respective printed circuit boards or other suitable devices that can be disposed in gateway node 104a to store and execute programming code.

The gateway node 104a can also include a transceiver device 220 communicatively coupled to the processor 202 and the memory device 204 via the bus 206. Non-limiting examples of a transceiver device 220 include an RF transceiver and other transceivers for wirelessly transmitting and receiving signals. The HAN client devices 102a-b can also include transceiver devices for communication with the HAN controller 103 or the gateway node 104a. In the aspect shown in FIG. 2, the transceiver device 220 is capable of implementing two MAC interfaces to communicate with the data network 106 and the HAN 100 via antennas 208, 210, respectively. While multiple antennas 208, 210 are shown for illustrative purposes, other aspects include a transceiver device 220 that can communicate with the data network 106 and the HAN 100 with a single antenna. The gateway node 104a can communicate with the data network 106 and the HAN 100 using a single transceiver device 220 via differing network protocols. For example, the gateway node 104a can communicate with a HAN 100 configured to use a CSMA protocol (e.g., ZigBee IEEE 802.15.4) via antenna 210 while the gateway node 104a can communicate with the data network 106 using the TSCH protocol (e.g., network protocol governed by IEEE 802.15.4e) via antenna 208. In some aspects, the gateway node 104a may communicate with both the data network 106 and the HAN 100 even if the data network 106 and the HAN 100 use different frequencies. For example, gateway node 104a may be configured to send and receive signals with the rest of the data network 106 at 920 MHz while the gateway node 104a may be configured to send and receive signals with the HAN 100 at a frequency of 900 MHz.

While gateway node 104a is shown with a single transceiver device 220 for exemplary purposes, in some embodiments, gateway node 104a may include multiple transceiver devices when the data network 106 is operating on a different set of frequencies or modulation techniques than the HAN 100. For example, a first transceiver device (configured for a first set of frequencies or modulation techniques) may be used for communication with the data network 106 and a second transceiver device (configured for a second set of frequencies or modulation techniques) may be used for communication with the HAN 100.

As mentioned above, the data network 106 may be an AMI mesh network that follows a TSCH communication protocol to communicate wireless information within the network and outside the network. In the TSCH protocol, devices within the network are synchronized on individual TSCH timeslots. Each timeslot in the TSCH protocol is of a time duration of duration "T" which can be defined in milliseconds or other appropriate time unit. The TSCH protocol also uses multiple channel frequencies for communication between devices in the network. A hopping pattern defines the channel used to communicate during each timeslot.

Figure 3:
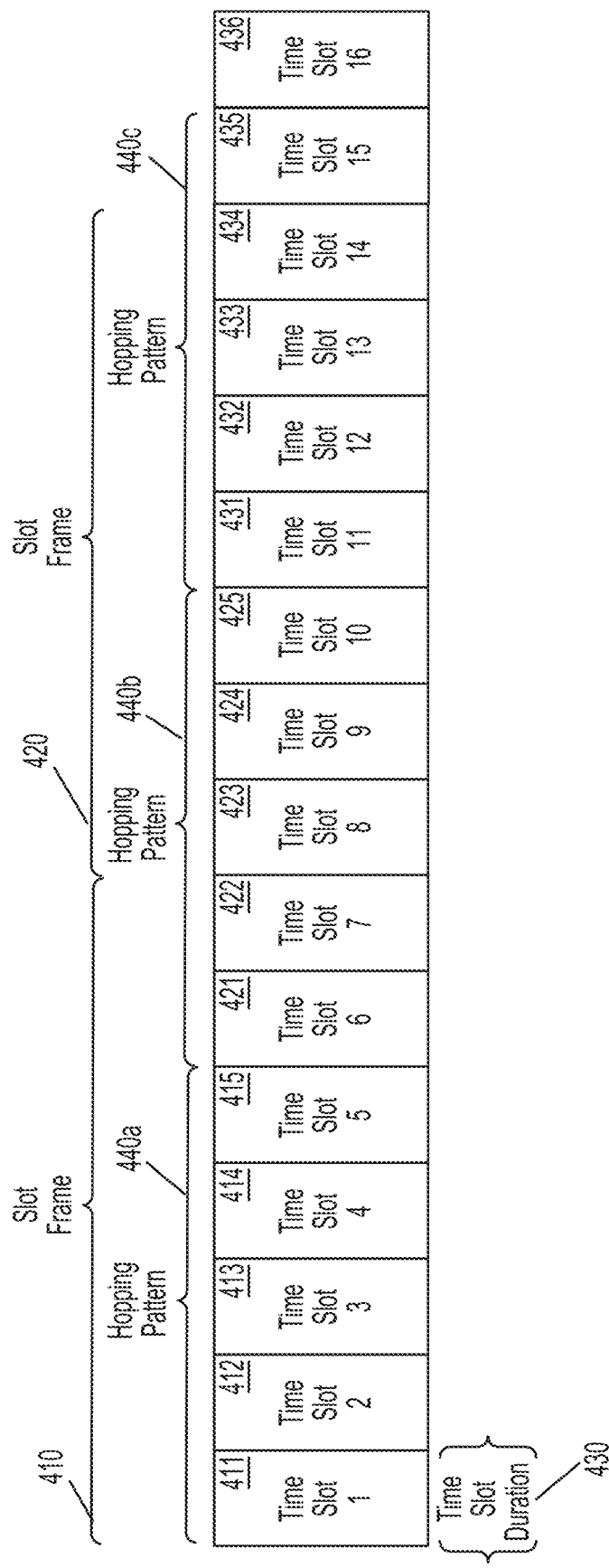
FIG. 3 is a block diagram of an example of an arrangement of timeslots in TSCH hopping patterns according to one aspect of the present disclosure.

FIG. 3 is a diagram illustrating example timeslots and a channel hopping pattern following a TSCH protocol. FIG. 3 illustrates timeslots 411-415, 421-425, and 431-436, each with the same timeslot duration 430. For illustrative purposes, each slot frame 410 and 420 includes seven timeslots. In other aspects, each slot frame may have more or less than seven timeslots. FIG. 3 also illustrates the hopping pattern 440 (shown as hopping patterns 440a-c). A hopping pattern defines a channel frequency or channel for each timeslot in the hopping pattern. For example, the hopping pattern 440a may be channel 4, channel 6, channel 3, channel 5, channel 7, i.e., it may associate channel 4 with timeslot 1, channel 6 with timeslot 2, channel 3 with timeslot 3, channel 5 with timeslot 4, and channel 7 with timeslot 5, each channel corresponding to a different frequency or frequency range. In FIG. 3, the hopping pattern 440a has a hopping pattern length of 5 and repeats. The first illustrated iteration of the hopping pattern 440a contains timeslots 1-5 (411-415), the second iteration of the hopping pattern 440b contains timeslots 6-10 (421-425), and the third iteration of the hopping pattern 440c contains timeslots 11-15 (431-435). The number of timeslots in a hopping pattern is independent of the number of timeslots in a slot frame.

While nodes in the data network 106 follow a TSCH channel hopping protocol, the HAN 100 operates under a CSMA communication protocol that is not time synchronized. Instead, low-powered CSMA devices (e.g., HAN controller 103 and HAN client devices 102a-b) periodically wake-up from a sleep state to receive and transmit RF signals with neighboring devices. To communicate with the HAN 100 following a CSMA protocol, the gateway node 104a is configured with a schedule that assigns the CSMA wake-up periods that correspond to one or more TSCH timeslots. During the timeslot that is assigned for communication with the CSMA node, the gateway node 104a switches to the channel used by the CSMA network.

Figure 4:
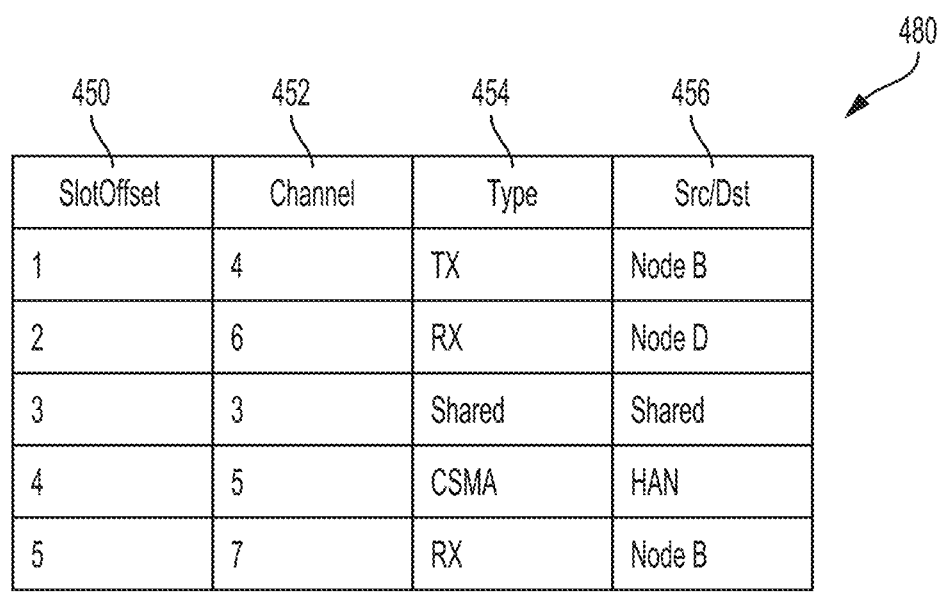
FIG. 4 is a table depicting an example schedule defining communication and channel requirements for each slot-offset in a TSCH hopping pattern according to one aspect of the present disclosure.

FIG. 4 is an example table 480 depicting a communication schedule for scheduling CSMA wake-up intervals into the TSCH time slot sequence for communicating with both the data network 106 and the HAN 100. The communication schedule for table 480 schedules communication for the example timeslots and channel hopping pattern shown in FIG. 3. Specifically, column 450 lists the five slot-offsets for each hopping pattern 440a-c (e.g., slot-offset 1 corresponds to timeslots 411, 421, and 431, slot-offset 2 corresponds to timeslots 412, 422, and 432, etc.). Column 452 lists the channel associated with each slot-offset. Column 454 identifies the type of communication assigned to the slot-offset and column 456 identifies the source or destination of the communication. As shown in table 480, during slot-offset 1 (i.e. timeslots 411, 421, and 431), the gateway node 104a is configured to transmit a communication to node B (e.g., node 104b in FIG. 1) on channel 4. During slot-offset 2 (timeslots 412, 422, and 432), the gateway node 104a is configured to listen for communications from node D (node 104*d* in FIG. 1) on channel 6. Slot-offset 3 is scheduled as a shared time slot. A shared time slot may be used as a configurable time slot for transmitting or receiving otherwise unscheduled communication from neighboring nodes. For example, if gateway node 104*a* needs additional bandwidth to transmit overflow data from HAN 100 to server system 108 (e.g., if the schedule does not otherwise provide sufficient bandwidth), the overflow bandwidth may be transmitted during slot-offset 3. At slot-offset 4 (timeslots 414, 424, 434), the gateway node 104*a* is configured to communicate with the HAN 100 (via, for example, HAN controller 103) on channel 5. During communication with HAN 100, the gateway node 104*a* may receive or transmit communication from the HAN 100 depending on the operational requirements of the HAN 100. Whether communication with the HAN 100 involves receiving messages or transmitting messages may be pre-determined during initial synchronization between HAN 100 and gateway node 104*a*. At slot-offset 5 (timeslots 415, 425, and 435), the gateway node 104*a* is configured to listen for communications from node B on channel 7. As shown in the communication schedule 480, the nodes 104*b-d* in the data network 106 (which operate via the TSCH networking protocol) utilize channels 4, 6, 3, and 7, each channel corresponding to a different frequency or frequency range. In contrast, the HAN 100 utilizes a single channel—channel 5. Through aspects disclosed herein, the gateway node 104*a* is configured to switch to channel 5 for receiving from or transmitting to HAN 100. For illustrative purposes, the table 480 in FIG. 4 indicates that the channel used by the HAN 100 (channel 5) is different from the channels used by the data network 106 (channels 4, 6, 3, and 7). In other aspects, the channel used by the HAN 100 may also be used by the data network 106 for communication within the data network 106 by scheduling the common channel in different slot-offsets.

Figure 5:
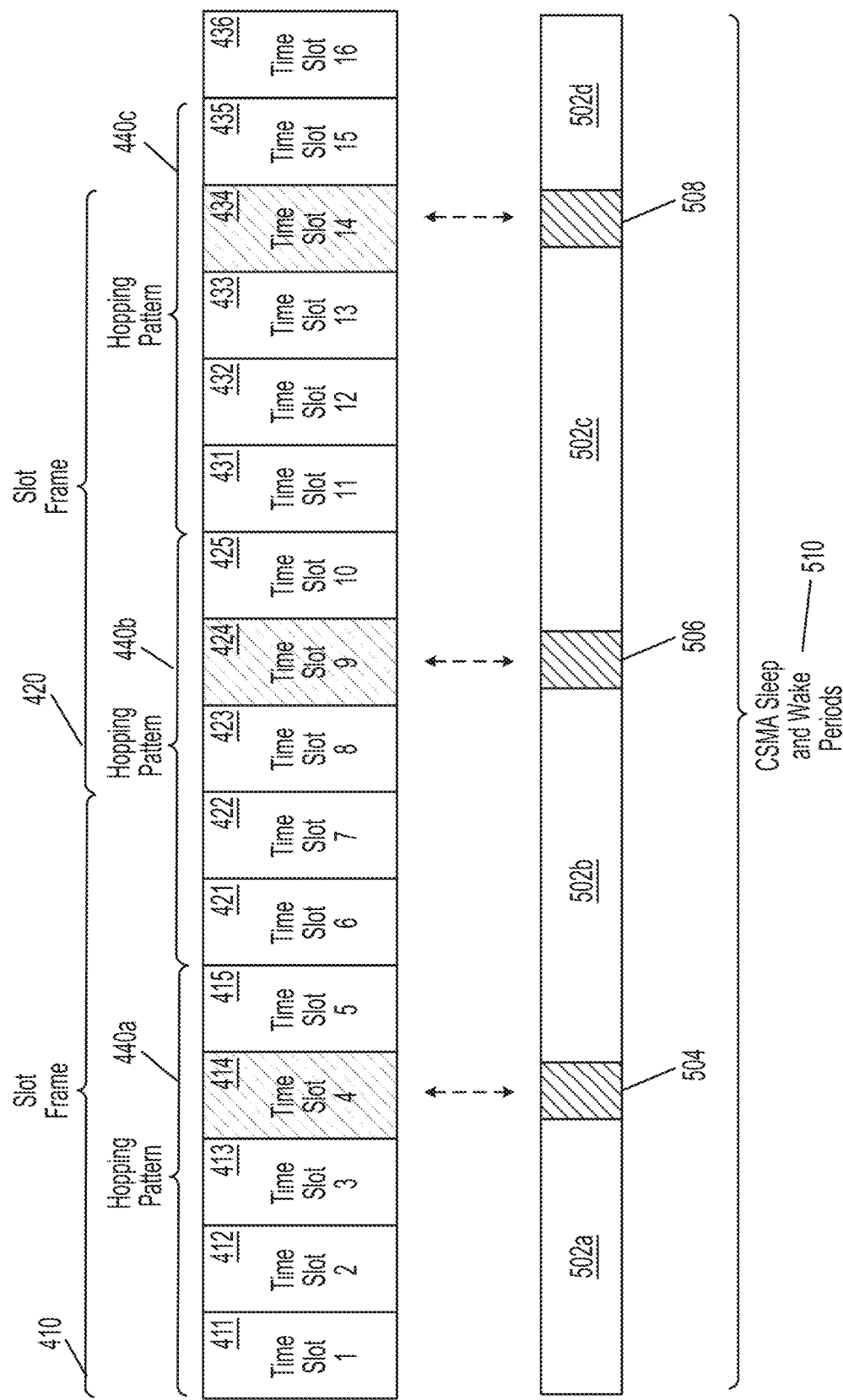
FIG. 5 is a block diagram of an example of a synchronization of wake-up periods in a CSMA timing diagram with specific slot-offsets in a TSCH hopping pattern according to one aspect of the present disclosure.

Via the communication schedule 480, the gateway node 104*a* is configured to communicate with the rest of the nodes 104*b-d* in the data network 106 and the HAN 100 by scheduling in the wake-up interval duty cycle of the HAN controller 103. The CSMA wake-up interval duty cycle is thus synchronized with the TSCH time slots used by the data network 106. FIG. 5 is a timing diagram illustrating a CSMA wake-up interval duty cycle that is synchronized with the TSCH time slots. FIG. 5 depicts time slots 411-415 of hopping pattern 440*a*, time slots 421-425 of hopping pattern 440*b*, and time lots 431-435 of hopping pattern 440*c* for the TSCH communication protocol used by data network 106. FIG. 5 also depicts the CSMA sleep and wake periods 510 for HAN controller 103. The CSMA sleep and wake periods 510 are based on the CSMA networking protocol used by the HAN controller 103. Sleep periods of the CSMA networking protocol are shown as timing periods 502*a-c* and wake periods of the CSMA networking protocol are shown as timing periods 504, 506, and 508. As shown in the shaded regions, the wake-up periods of the CSMA networking protocol (timing periods 504, 506, 508) are synchronized with specific time slots in hopping patterns 440*a-c* (time slots 414, 424, and 434) as per communication schedule 480.

During timing period 502*a* (i.e. during time slots 411-413), HAN controller 103 remains in a low-powered sleep state in which the HAN controller 103 does not receive or transmit any communication. Low-powered sleep states are used, for example, to optimize battery life. At the beginning of timing period 504, the HAN controller 103 wakes from the sleep state and powers on a transceiver for receiving and transmitting potential communication with the data network 106 or with other nodes within the HAN 100 (i.e. HAN client devices 102*a-b*). During timing period 504, the HAN controller 103 may transmit messages to gateway node 104*a*. The messages may include, for example, information on the power consumption information measured by HAN client devices 102*a-b*. During timing period 504, the HAN controller 103 may also receive messages from the gateway node 104*a*. At the end of timing period 504 and beginning of timing period 502*b*, the HAN controller 103 returns to a sleep state, as shown in timing period 502*b*. The HAN controller 103 wakes from sleep state and communicates with the gateway node 104*a*. The sleep/wake process continues for timing periods 502*c*, 508, 502*d*, and additional timing periods.

The schedule defining whether the HAN controller 103 transmits messages or listens for messages during the timing periods 504, 506, 508 (i.e. the wake-up periods of HAN controller 103) is determined by the operational requirements of the HAN 100 and is provided to gateway node 104*a*. During a given wake-up period 504, 506, or 508, the gateway node 104*a* may transmit a message to the HAN 100 or receive a message from the HAN 100. In some aspects, the gateway node 104*a* may employ a Receiver Initiated Transport ("RIT") procedure, as defined by IEEE 802.15.4-2015, to elicit a transmission from the HAN controller 103 during timing period 504, 505, or 508. The schedule defining the timing periods 504, 506, and 508 may also specify that one or more of the timing periods 504, 506, and 508 are shared timing periods used for transmitting to or receiving from the data network 106, depending on the operational requirements of the HAN 100.

While FIG. 5 depicts the timing periods 504, 506, 508 (the wake-up periods of HAN controller 103) as periodic for illustrative purposes, the wake-up periods can also be pre-determined. For example, the HAN controller may be provisioned with wake-up periods that occur at specific intervals that do not follow a periodic pattern.

Figure 6:
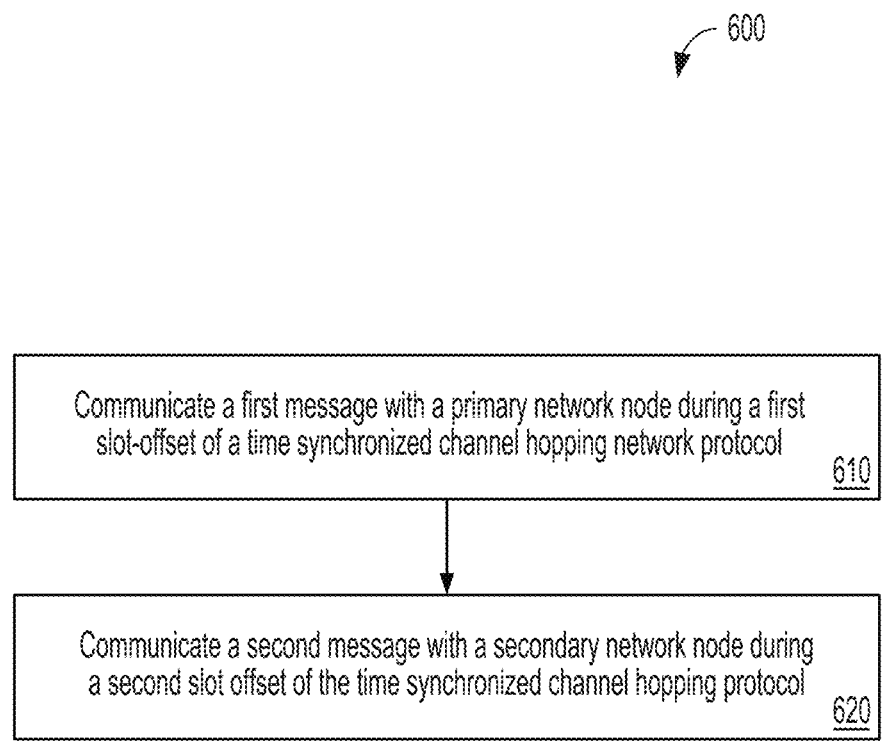
FIG. 6 is a flowchart of an example of a process for scheduled communication with a primary network communicating using TSCH and a secondary network communicating using CSMA according to one aspect of the present disclosure.

FIG. 6 is a flowchart illustrating an example process 600 for communicating between a primary network operating using a time synchronized channel hopping networking protocol with a secondary network (e.g., a HAN) using a CSMA networking protocol based on a determined schedule. For illustrative purposes, the process 600 is described with reference to the system implementations depicted in FIGS. 1-2. Other implementations, however, are also possible.

In block 610, the gateway node 104*a* communicates a first message with a primary network node during a first selected slot-offset of a TSCH protocol. In some examples, the gateway node 104*a* communicates on a TSCH network per a schedule 480 that accommodates the wake-up duty cycle of HAN controller 103 by scheduling each wake-up period to correspond to a TSCH slot-offset. As described above, the TSCH slot-offset can correspond to repeating time slots in a hopping pattern. Based on the schedule 480, the gateway node 104*a* communicates with one of adjacent nodes 104*b-d* in data network 106 during a first selected slot-offset in a TSCH hopping pattern. Communication includes transmission of RF signals to one of adjacent nodes 104*b-d* or receipt of RF signals from one of adjacent nodes 104*b-d* on a specific channel.

In block 620, the gateway node 104*a* communicates a second message with a secondary network node during a second selected slot-offset of the TSCH protocol. The secondary network node can be communicating using a CSMA protocol. For example, according to communication schedule 480, during a second slot-offset (i.e. a slot-offset that corresponds to the wake-up period of HAN controller 103), the gateway node 104a communicates with HAN controller 103 on a CSMA channel. The CSMA channel may be different from the channels used by the data network 106 communicating via the TSCH communication protocol. In other aspects, the CSMA channel may not be exclusive to the HAN 100 and may also be utilized by the data network 106 (e.g., the gateway node 104a communicates with the HAN controller 103 on a common channel at a slot-offset synchronized with the wake-up period of the HAN controller 103, and the gateway node 104a communicates with an adjacent node in the data network 106 using the same common channel at a slot-offset that falls within a sleep period of the HAN controller 103).

Gateway node 104a may be configured to communicate with both data network 106 and HAN 100 according to a communication schedule 480 via any suitable method. For example, schedule 480 may be stored as a data array in a database in memory 204 for gateway node 104a. During each time slot in the TSCH communication protocol used by data network 106, the transceiver device 220 communicates to an adjacent node 104b-d (i.e. primary network nodes) or HAN controller 103 (i.e. the secondary network node) according to the schedule 480. During each time slot, the transceiver device 220 also switches to the appropriate frequency for communicating with an adjacent primary network node or secondary network node according to the schedule 480.

The communication schedule 480 may be determined via any suitable method depending on the operational requirements on the HAN 100. For example, as described above, a node in the HAN 100, such as HAN controller 103, may communicate during a specific wake-up duty cycle in a CSMA protocol. The wake-up periods of HAN controller 103 vary based on the operational requirements of the HAN controller 103. For example, a HAN controller 103 with a shorter total battery life may communicate using longer wake-up periods compared to a HAN controller with a longer total battery life. As described above, the wake-up periods of HAN controller 103 may be periodic or may be pre-determined and not necessarily periodic. In one aspect, the gateway node 104a may be pre-configured during initialization to communicate with a specific HAN 100 with a given wake-up period. In such an implementation, the memory 204 is preconfigured with a schedule 480 that is customized to the TSCH networking protocol used by the data network 106 and the specific wake-up duty cycle and channel requirements of the HAN 100.

In another aspect, each node 104a-d can receive a beacon message or other scheduling communication transmitted from a secondary network node (i.e. HAN controller 103) that is connected to the respective node 104a-d. The beacon message may include information on the operational requirements (e.g., the wake-up duty cycle, channel requirements, synchronization information, and other information) of the HAN 100. For example, a HAN 100 or HAN controller 103 may be initiated and connected to a data network 106 that is already in operation. During synchronization with the data network 106 via gateway node 104a, the HAN controller 103 transmits beacon messages indicating the wake-up duty cycle of HAN controller 103. In response to the data indicating the wake-up duty cycle of HAN controller 103, gateway node 104a adjusts a current communication schedule to accommodate the wake-up duty cycle of the HAN controller 103. The adjusted communication schedule synchronizes each wake-up period of HAN controller 103 with a specific time slot in the TSCH hopping pattern, as described above with respect to FIGS. 4 and 5. To synchronize the adjusted schedule with the rest of the data network 106, the gateway node 104a may distribute the adjusted schedule to nodes 104b-d (i.e. adjacent nodes in data network 106) via RF signals carrying information on the adjusted schedule. Nodes 104b-d, in response, adjust internal communications schedules and re-distribute the adjusted schedule to further nodes in the data network 106.

In another aspect, the schedule 480 is determined by a central controller for the data network 106, such as a head-end unit or head-end system. For example, a head-end unit controlling the data network 106 receives beaconing messages transmitted by HAN controller 103 and determines the communication schedule 480 such that the schedule accommodates the wake-up duty cycle of HAN controller 103. The head-end unit distributes the communication schedule 480 to nodes 104a-d in data network 106.

Figure 7:
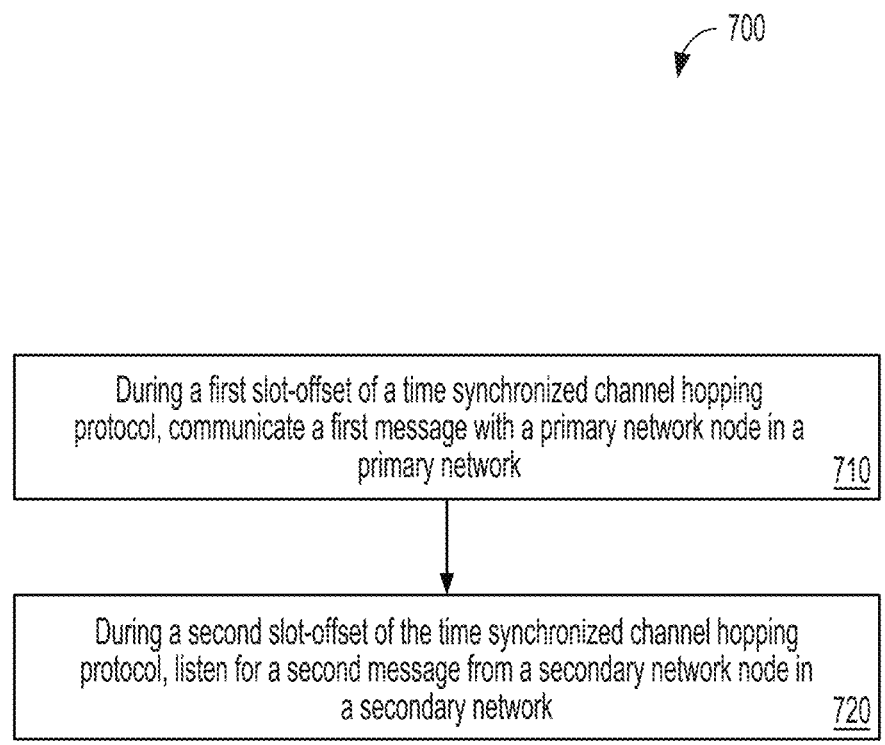
FIG. 7 is a flowchart of an example of another process for scheduled communication with a primary network communicating using TSCH and a secondary network communicating using CSMA according to one aspect of the present disclosure.

FIG. 7 is a flowchart illustrating an additional example process 700 for communicating between a primary network operating using a time synchronized channel hopping networking protocol with a secondary network using a CSMA networking protocol based on a determined schedule. For illustrative purposes, the process 700 is described with reference to the system implementations depicted in FIGS. 1-2. Other implementations, however, are also possible. As shown in block 710, the process 700 includes, communicating a first message with a primary network node in a primary network during a first selected slot-offset of a time synchronized channel hopping protocol, nodes within the primary network communicating using the time synchronized channel hopping protocol. For example, the gateway node 104a communicates on a TSCH network per a schedule 480. Based on schedule 480, gateway node 104a communicates to one of adjacent nodes 104b-d during a slot-offset specified in the schedule 480.

In block 720, the gateway node 104a listens for a second message from a secondary network node in a secondary network during a second selected slot-offset of the TSCH protocol. The secondary network node can communicate within the secondary network using a CSMA protocol by communicating during periodic or pre-determined wake-up intervals. As described above, a communication schedule 480 can accommodate the wake-up duty cycle of HAN controller 103 by scheduling each wake-up period in a TSCH slot-offset. However, the HAN controller 103, operating on a CSMA network in the HAN 100, may not require transmission of a message every wake-up period. The frequency of communication from the HAN controller 103 may vary depending, for example, on the operation of the HAN 100. The gateway node 104a listens for communication from HAN controller 103 during the wake-up periods of the HAN controller 103 regardless of whether the HAN controller 103 is actively transmitting or receiving communication.

For example, referring to FIG. 5, the HAN controller 103 may transmit information gathered by HAN client devices 102a-b during timing period 504 (the first wake-up period) and return to sleep state at timing period 502b. During the second wake-up period (timing period 506), the HAN controller 103 may not need to receive or transmit any communication and may remain in the sleep state. During timing period 508, the HAN controller 103 may continue to communicate with the gateway node 104a. To accommodate the varying communication frequency of the HAN controller 103, the gateway node 104a listens for communication from HAN controller 103 during each wake-up period (timing periods 504, 506, 508) of the HAN controller 103. The gateway node 104a listens for communication by determining if any RF communication from the HAN controller 103 is detected. If the gateway node 104a does not detect any communication from the HAN controller 103 at a given wake-up period, the gateway node 104a resumes communication with data network 106 per the communication schedule 480. If the gateway node 104a detects communication from HAN controller 103 (e.g., detects RF signals from HAN controller 103), the gateway node 104a processes the communication and then resumes communication with data network 106 per the communication schedule 480.

Figure 8:
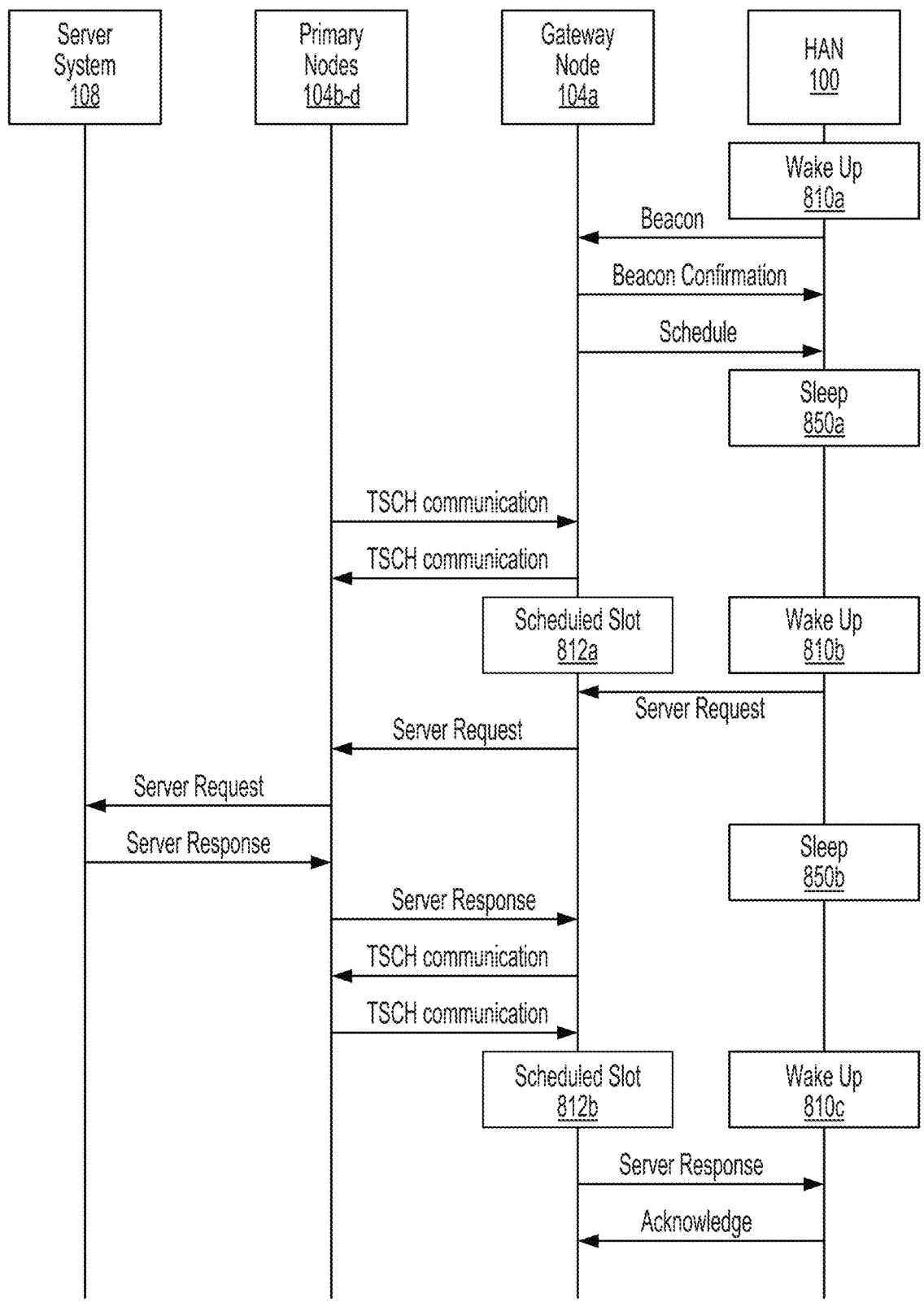
FIG. 8 is a signal flow diagram of an example of scheduled communication between a primary network communicating using TSCH and a secondary network communicating using CSMA according to one aspect of the present disclosure.

FIG. 8 is a signal flow diagram of an example of scheduled communication between a primary network operating using a TSCH networking protocol with a secondary network using a CSMA networking protocol based on a determined schedule. FIG. 8 is described with reference to the system implementations depicted in FIGS. 1-2, but other implementations are possible.

In block 810a, the HAN 100 (i.e., the HAN controller 103 or a secondary node in the HAN 100) wakes up. In this example, a beacon message is transmitted by the HAN 100 and detected by the gateway node 104a. In some examples, the beacon can include a request for a specified bandwidth (e.g., 1800 bits/hour) or other information needed for communication with the HAN 100. The gateway node 104a transmits a signal in response to the detecting the beacon confirming receipt of the beacon. The beacon and beacon response are one example for joining the gateway node 104a to the HAN 100, but other implementations are possible. Once the gateway node 104a is joined to the HAN 100, the gateway node 104a can transmit a schedule to the HAN 100 using the CSMA networking protocol. The HAN 100 can use the schedule to determine a wake/sleep cycle such that the HAN 100 is synchronized with the gateway node 104a. For example, the schedule may instruct the HAN 100 to awake in 1000 ms to communicate with the gateway node 104a. In one implementation, an API on the gateway node 104a receives the request for bandwidth from the HAN 100 and determines an appropriate schedule for the HAN 100.

In some aspects, the periodic or pre-determined wake-up cycle for a secondary network node in the HAN 100 is scheduled into one or more repeating time slots in the TSCH hopping pattern used by the primary network. For example, a secondary network node may operate under a low-power sleep mode (e.g., with an RF transceiver that is powered down) and exit sleep mode e.g., "wake up" and enable the RF transceiver) at certain time intervals. The gateway node 104a can determine a communication schedule that accommodates the secondary network node wake-up cycle. In additional or alternative aspects, the schedule can be dynamic and the gateway node 104a can transmit an updated schedule to the HAN 100, either periodically or as needed.

In block 850a, the HAN 100 enters a sleep state based on the schedule. In some examples, the gateway node 104a transmits the schedule to the other primary nodes 104b-d in the primary network and one of the primary nodes 104b-d transmits the schedule to the server system 108. In additional or alternative examples, the gateway node 104a transmits the schedule directly to the server system 108. In additional or alternative examples, the HAN 100 or gateway node 104a transmits the schedule to multiple components of the primary network prior to the HAN 100 entering the sleep state. While the HAN 100 is in the sleep state the gateway node 104a communicates with the other primary nodes 104b-d using the TSCH protocol.

In block 810b, the HAN 100 wakes up from the sleep state. Substantially simultaneously, in block 812a, the gateway node 104a recognizes a scheduled time slot reserved in the schedule for communicating with the HAN 100. In this example, the gateway node 104a listens for communications from the HAN 100 and receives a request for data from the server system 108. The gateway node 104a transmits the server request to the server system 108 via the other primary nodes 104b-d. The gateway node 104a receives a response from the server system 108 via the other primary nodes 104b-d and stores the response in memory in response to determining that the HAN 100 has entered another sleep state in block 850b based on the schedule. While the HAN 100 is in the sleep state (during other time slots) the gateway node 104a communicates with the other primary nodes 104b-d using the TSCH protocol.

In block 810c, the HAN 100 wakes up from the sleep state. Substantially simultaneously, in block 812b, the gateway node 104a recognizes a scheduled time slot reserved in the schedule for communicating with the HAN 100. The gateway node 104a retrieves the server response from memory and transmits the server response to the HAN 100. In response to receiving the server response, the HAN 100 transmits an acknowledgment signal to the gateway node 104a.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:

1. A gateway node, comprising:
a transceiver device configured to communicate with a plurality of primary network nodes and with a secondary network node, wherein the plurality of primary network nodes communicate on multiple channels using a time synchronized channel hopping networking protocol and wherein the secondary network node communicates on a single channel using a carrier sense multiple access networking protocol by communicating during wake-up intervals; a processor communicatively coupled to the transceiver device; and
a non-transitory computer-readable medium in which instructions executable by the processing device are stored, the instructions for causing the processing device to perform operations comprising:
communicating a first message with a primary network node during a first selected slot-offset of a plurality of slot-offsets of the time synchronized channel hopping networking protocol, wherein the primary network node is among the plurality of primary network nodes; and
communicating a second message with the secondary network node during a second selected slot-offset of the plurality of slot-offsets of the time synchronized channel hopping protocol on the single channel using the carrier sense multiple access networking protocol, wherein the wake-up intervals of the secondary network node are synchronized with the second selected slot-offset;
wherein the gateway node provides communication between the secondary network node and a resource provider system via the plurality of primary network nodes, and wherein the secondary network node is a low-powered device that is part of a home area network.

2. The gateway node of claim 1, wherein the gateway node communicates with the primary network node during the first slot-offset of the time synchronized channel hopping protocol and communicates with the secondary network node during the second selected slot-offset of the time synchronized channel hopping protocol based on a communication schedule.

3. The gateway node of claim 2, wherein the communication schedule indicates, for each slot-offset in a hopping pattern in the time synchronized channel hopping networking protocol, a specific channel for communication, and a type of communication specifying a transmit mode, a receive mode, or a carrier sense multiple access mode, wherein the slot-offsets in the hopping pattern repeat for subsequent hopping patterns.

4. The gateway node of claim 2, wherein the gateway node is configured to receive the communication schedule via a common communication from a head-end system for the primary network to each of the plurality of nodes of the primary network.

5. The gateway node of claim 2, wherein the gateway node is configured to receive the communication schedule via a beacon message received during initial synchronization between the secondary network node and the gateway node.

6. The gateway node of claim 5, wherein the gateway node is configured to distribute the communication schedule to adjacent primary network nodes in the primary network.

7. A method, comprising:
communicating a first message with a primary network node using a time synchronized channel hopping networking protocol during a first selected slot-offset of a plurality of slot-offsets of the time synchronized channel hopping networking protocol, wherein the primary network node is among the plurality of primary network nodes that communicate on multiple channels using the time synchronized channel hopping protocol; and
communicating a second message with a secondary network node during a second selected slot-offset of the plurality of slot-offsets of the time synchronized channel hopping protocol, wherein wake-up intervals of the secondary network node are synchronized with the second slot-offset, and wherein the second message is communicated on a single channel using a carrier sense multiple access networking protocol;
wherein the gateway node communicates with the primary network node during the first selected slot-offset of the time synchronized channel hopping protocol and communicates with the secondary network node during the second selected slot-offset of the time synchronized channel hopping protocol based on a communication schedule, and
wherein the communication schedule indicates, for each slot-offset in a hopping pattern in the time synchronized channel hopping networking protocol, a specific channel for communication, a type of communication specifying a transmit mode, a receive mode, or a carrier sense multiple access mode, and a source node or destination node for the communication, wherein the slot-offsets in the hopping pattern repeat for subsequent hopping patterns.

8. The method of claim 7, wherein the gateway node provides communication between the secondary network node and a resource provider system via the plurality of primary network nodes, and wherein the secondary network node is a low-powered device that is part of a home area network.

9. The method of claim 7, wherein the communication schedule is received at a gateway node from a head-end system for the primary network.

10. The method of claim 7, wherein the communication schedule is received at a gateway node via a beacon message from the secondary network.

11. The method of claim 10, further comprising:
transmitting the communication schedule to adjacent primary network nodes in the primary network.

12. A method, comprising:
during a first selected slot-offset of a plurality of slot-offsets of a time synchronized channel hopping protocol, communicating, by a gateway node, a first message with a primary network node in a primary network using the time synchronized channel hopping protocol, the primary network node part of a plurality of nodes communicating using the time synchronized channel hopping protocol; and
during a second selected slot-offset of the plurality of slot-offsets of the time synchronized channel hopping protocol, listening, by the gateway node, for a second message from a secondary network node in a secondary network, the secondary network node communicating the second message using a carrier sense multiple access protocol by communicating during wake-up intervals, wherein the wake-up intervals of the secondary network node are synchronized with the second selected slot-offset;
wherein the first selected slot-offset and the second selected slot-offset are identified by a communication schedule that indicates, for each of the slot-offsets of the plurality of slot-offsets, a specific channel for communication, a type of communication specifying a transmit mode, a receive mode, or a carrier sense multiple access mode, and a source node or a destination node for the communication, wherein the slot-offsets in the hopping pattern repeat for subsequent hopping patterns.

13. The method of claim 12, wherein the first selected slot-offset and the second selected slot-offset are part of a hopping pattern in the time synchronized channel hopping protocol, and wherein the first message during the first selected slot-offset is communicated on a first channel and wherein the second message during the second selected slot-offset is communicated on a second channel different from the first channel.

14. The method of claim 12, wherein the communication schedule is received by the gateway node from a common communication from a head-end unit to a plurality of nodes of the primary network.

15. The method of claim 12, wherein the communication schedule is received by the gateway node from an adjacent node that is part of the primary network.

16. The method of claim 12, wherein the gateway node provides communication between the secondary network node and a resource provider system via the primary network, and wherein the secondary network node is a low-powered device that is part of a home area network.

17. A method, comprising:
during a first selected slot-offset of a plurality of slot-offsets of a time synchronized channel hopping protocol, communicating, by a gateway node, a first message with a primary network node in a primary network using the time synchronized channel hopping protocol, the primary network node part of a plurality of nodes communicating using the time synchronized channel hopping protocol; and during a second selected slot-offset of the plurality of slot-offsets of the time synchronized channel hopping protocol, listening, by the gateway node, for a second message from a secondary network node in a secondary network, the secondary network node communicating the second message using a carrier sense multiple access protocol by communicating during wake-up intervals, wherein the wake-up intervals of the secondary network node are synchronized with the second selected slot-offset, wherein the gateway node provides communication between the secondary network node and a resource provider system via the primary network, and wherein the secondary network node is a low-powered device that is part of a home area network.

18. The method of claim 17, wherein the first selected slot-offset and the second selected slot-offset are part of a hopping pattern in the time synchronized channel hopping protocol, and wherein the first message during the first selected slot-offset is communicated on a first channel and wherein the second message during the second selected slot-offset is communicated on a second channel different from the first channel.

* * * * *